(12) United States Patent
Ekin et al.

(10) Patent No.: US 8,343,601 B1
(45) Date of Patent: Jan. 1, 2013

(54) WATERBORNE POLYURETHANE COATING COMPOSITIONS

(75) Inventors: Abdullah Ekin, Imperial, PA (US); Raymond Stewart, Lawrence, PA (US); Ramesh Subramanian, Coraopolis, PA (US); Torsten Pohl, Leverkusen (DE)

(73) Assignees: Bayer MaterialScience LLC, Pittsburgh, PA (US); Bayer MaterialScience AG, Leverkusen (DE)

( * ) Notice: Subject to any disclaimer, the term of this patent is extended or adjusted under 35 U.S.C. 154(b) by 27 days.

(21) Appl. No.: 13/176,911

(22) Filed: Jul. 6, 2011

(51) Int. Cl.
*A47G 19/22* (2006.01)
*B28B 21/00* (2006.01)
*B28B 21/72* (2006.01)
*B28B 23/08* (2006.01)
*B29D 22/00* (2006.01)
*B29D 23/00* (2006.01)
*B32B 1/08* (2006.01)
*C03C 17/32* (2006.01)
*F16L 9/10* (2006.01)

(52) U.S. Cl. ............ 428/34.7; 428/34.4; 428/34.6; 524/832; 524/819; 524/456; 524/589; 524/590; 524/839

(58) Field of Classification Search .......... 524/832, 524/819, 456, 589, 590, 839; 428/34.4, 34.6, 428/34.7
See application file for complete search history.

(56) References Cited

U.S. PATENT DOCUMENTS

| | | |
|---|---|---|
| 3,124,605 A | 3/1964 | Wagner |
| 3,152,162 A | 10/1964 | Fischer et al. |
| 3,358,010 A | 12/1967 | Britain |
| 3,644,490 A | 2/1972 | Schmelzer et at |
| 3,862,973 A | 1/1975 | Dietrich et al. |
| 3,903,127 A | 9/1975 | Wagner et al. |
| 3,906,126 A | 9/1975 | Kaiser et al. |
| 4,051,165 A | 9/1977 | Wagner et al. |
| 4,088,665 A | 5/1978 | Findeisen et al. |
| 4,108,814 A | 8/1978 | Reiff et al. |
| 4,147,714 A | 4/1979 | Hetzel et al. |
| 4,151,143 A | 4/1979 | Blank et al. |
| 4,220,749 A | 9/1980 | Reichmann et al. |
| 4,280,944 A | 7/1981 | Saito et al. |
| 4,288,586 A | 9/1981 | Bock et al. |
| 4,294,719 A | 10/1981 | Wagner et al. |
| 4,324,879 A | 4/1982 | Bock et al. |
| 4,344,855 A | 8/1982 | Schäfer et al. |
| 4,419,513 A | 12/1983 | Breidenbach et al. |
| 4,888,383 A | 12/1989 | Huybrechts |
| 5,308,912 A | 5/1994 | Margotte et al. |
| 5,331,039 A | 7/1994 | Blum et al. |
| 5,552,477 A | 9/1996 | Dhein et al. |
| 5,914,383 A | 6/1999 | Richter et al. |
| 6,403,175 B1 | 6/2002 | Speier et al. |
| 6,962,953 B2 | 11/2005 | Probst et al. |

FOREIGN PATENT DOCUMENTS

| | | |
|---|---|---|
| CA | 2253119 | 5/1999 |
| EP | 0519074 B1 | 3/1998 |
| GB | 1571933 | 7/1980 |

OTHER PUBLICATIONS

Methoden der Organischen Chemie, Houben-Weyl, 4th Edition, vol. E20/Part 2, p. 1682, Georg Thieme Verlag, Stuttgart, 1987.

*Primary Examiner* — Michael C Miggins

(57) ABSTRACT

Aqueous polyurethane coating compositions are disclosed in this specification. The aqueous polyurethane coating compositions contain a polycarbonate-polyurethane resin component, an aminoplast resin component, and a polyacrylic polyol component.

20 Claims, No Drawings

WATERBORNE POLYURETHANE COATING COMPOSITIONS

TECHNICAL FIELD

This disclosure relates to one-component waterborne polyurethane coating compositions and to the use of such compositions for coating substrates.

BACKGROUND

Glass substrates may be coated, for example, to provide a decorative effect or to enhance substrate properties. For instance, glass substrates may be coated to provide anti-shattering properties, abrasion resistance, increased elasticity, and solvent resistance. Glass containers, for example, may benefit from clear coatings that provide mechanical protection to the external surfaces to help minimize mechanical damage, such as scuffing or marring, to the containers during transportation, storage, filling operations, and distribution.

SUMMARY

Embodiments disclosed in this specification are directed to aqueous polyurethane coating compositions. The aqueous polyurethane coating compositions comprise a polyol resin, an aminoplast resin, and a polycarbonate-polyurethane resin.

In various embodiments, an aqueous polyurethane coating composition comprises: (a) a water-dilutable hydroxy-functional polyacrylic resin; (b) a water-dilutable aminoplast resin; and (c) a water-dilutable polycarbonate-polyurethane resin. The water-dilutable hydroxy-functional polyacrylic resin comprises a reaction product of: (A1) an olefinically unsaturated hydroxy-functional monomer; (A2) an olefinically unsaturated monomer that comprises an ionic group or a potentially ionic group; and (A3) an olefinically unsaturated monomer that does not comprise an ionic, potentially ionic group, or a hydroxyl group. The hydroxy-functional polyacrylic resin component (a) and the aminoplast resin component (b) react at temperatures above ambient temperature to form crosslinks. The polycarbonate-polyurethane resin is non-functional.

It is understood that the invention disclosed and described in this specification is not limited to the embodiments summarized in this Summary.

DESCRIPTION

Various embodiments are described and illustrated in this specification to provide an overall understanding of the structure, function, operation, manufacture, and use of the disclosed products and processes. It is understood that the various embodiments described and illustrated in this specification are non-limiting and non-exhaustive. Thus, the invention is not limited by the description of the various non-limiting and non-exhaustive embodiments disclosed in this specification. Rather, the invention is defined solely by the claims. The features and characteristics illustrated and/or described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. Therefore, any such amendments comply with the requirements of 35 U.S.C. §112, first paragraph, and 35 U.S.C. §132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference throughout this specification to "various non-limiting embodiments," or the like, means that a particular feature or characteristic may be included in an embodiment. Thus, use of the phrase "in various non-limiting embodiments," or the like, in this specification does not necessarily refer to a common embodiment, and may refer to different embodiments. Further, the particular features or characteristics may be combined in any suitable manner in one or more embodiments. Thus, the particular features or characteristics illustrated or described in connection with various embodiments may be combined, in whole or in part, with the features or characteristics of one or more other embodiments without limitation. Such modifications and variations are intended to be included within the scope of the present specification. In this manner, the various embodiments described in this specification are non-limiting and non-exhaustive.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges subsumed within the recited range. For example, a range of "1 to 10" is intended to include all sub-ranges between (and including) the recited minimum value of 1 and the recited maximum value of 10, that is having a minimum value equal to or greater than 1 and a maximum value equal to or less than 10. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. §112, first paragraph, and 35 U.S.C. §132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

The various embodiments disclosed and described in this specification provide waterborne (i.e., aqueous) polyurethane coating compositions that exhibit properties beneficial for substrates such as, for example, glass substrates. The aqueous polyurethane coating compositions disclosed herein provide cured coating films exhibiting decreased hardness, increased flexibility, increased impact resistance, good substrate adhesion in severe environments, increased abrasion resistance, and increased solvent resistance. The aqueous polyurethane coating compositions provide beneficial properties to substrates such as, for example, glass substrates. The aqueous polyurethane coating compositions may be one-component compositions that are free of blocking agents. The aqueous polyurethane coating compositions may comprise aminoplast crosslinking components for thermal curing.

One-component coating compositions comprise premixed compositions that have acceptable pot-life and storage stability, and are applied to substrates and cured under specific conditions such as, for example, at elevated temperatures or upon exposure to ultraviolet light. One-component systems include, for example, hydroxy-functional resins crosslinked with alkoxylated aminoplast resins or reversibly blocked isocyanates. In contrast, two-component coating compositions comprise two separate and mutually reactive components that are mixed immediately prior to application to substrate. The separate components respectively contain ingredients that are reactive under ambient conditions and that begin appreciable formation of cured resin immediately upon mixture. Therefore, the two components must remain separated until immediately before application due to limited pot-life.

U.S. Pat. No. 4,280,944, which is incorporated by reference into this specification, describes aqueous polyether-based polyurethane dispersions, which, by virtue of the free hydroxyl groups and blocked isocyanate groups contained therein, constitute a one-component system, which can be thermally cured. However, it may be desirable to provide one-component aqueous polyurethane dispersion coating compositions that do not contain blocking agents and are thermally curable. Use of melamine as a crosslinker is one alternative to crosslink hydroxy-functional polyacrylic polyurethane dispersions.

EP-A 519,074, which is incorporated by reference into this specification, discloses an aqueous glass coating composition that is applied in two coats, wherein the topcoat contains three main components: an aqueous polyurethane dispersion, an aqueous epoxy resin, and an aqueous melamine/formaldehyde resin. The polyurethane dispersion achieves the required final properties only after the addition of substantial quantities of the other two resins. Accordingly, the disclosed coating composition is a multi-component composition as opposed to a one-component composition.

Aminoplast crosslinking components, such as, for example, melamine crosslinkers, may be added to waterborne polyurethane coating compositions to provide one-component thermally-curable waterborne polyurethane coating compositions that are free of blocking agents. Generally, the addition of aminoplast crosslinking components increases the hardness of the cured coating film. As such, the use of aminoplast crosslinking components may result in undesirable coating properties such as, for example, increased brittleness, decreased impact resistance, and decreased abrasion resistance.

These effects may be particularly problematic for substrates such as, for example, glass materials, which may readily show mechanical surface damage of relatively hard and brittle coating films on the substrate. Further, relatively hard and brittle coating films tend to exhibit increased mechanical abrasion, wear, and erosion. However, the present inventors discovered one-component thermally-curable aqueous polyurethane coating compositions that are free of blocking agents, that contain aminoplast crosslinking components, and that exhibit low hardness and high flexibility, high impact resistance and toughness, and high abrasion resistance.

The one-component thermally-curable aqueous polyurethane coating compositions disclosed herein may comprise: (a) a polyol resin; (b) an aminoplast resin, and (c) a polycarbonate-polyurethane resin. As used herein, the term "polyurethane" refers to polymeric or oligomeric materials comprising urethane groups, urea groups, or both. The term "polyurethane" also refers to polymeric or oligomeric resins or crosslinked polymer networks comprising urethane groups, urea groups, or both. As used herein, the term "polyol" refers to compounds comprising at least two unreacted hydroxyl groups. Polyols may include monomers, polymers and/or oligomers comprising at least two pendant and/or terminal hydroxyl groups.

In various non-limiting embodiments, the polyol resin component (a) of the aqueous polyurethane coating compositions disclosed herein may comprise a water-dilutable hydroxy-functional polyacrylic resin. As used herein, the term "polyacrylic resin" refers to oligomeric or polymeric macromolecules comprising residues of olefinically unsaturated monomers. Water-dilutable hydroxy-functional polyacrylic resins may comprise oligomers or polymers of olefinically unsaturated monomers that comprise hydroxyl groups; sulfonic acid groups and/or carboxyl groups; sulfonate groups and/or carboxylate groups; or other ionic groups or potentially ionic groups.

In various non-limiting embodiments, the polyol resin component (a) is a water-dilutable hydroxy-functional polyacrylic resin. As used herein, the term "water-dilutable" refers to solubility as a molecular solution in water, or dispersability as a dispersion, emulsion, suspension, colloid, sol, or the like, in water, with or without external dispersants, emulsifiers, surfactants, co-solvents, or the like. As used herein, the term "hydroxy-functional" refers to molecules comprising at least one unreacted hydroxyl group.

In various non-limiting embodiments, the polyol resin component (a) of the aqueous polyurethane coating compositions disclosed herein may comprise a water-dilutable hydroxy-functional polyacrylic resin. As used herein, the term "polyacrylic resin" refers to oligomeric or polymeric macromolecules comprising residues of olefinically unsaturated monomers. Water-dilutable hydroxy-functional polyacrylic resins may comprise oligomers or polymers of olefinically unsaturated monomers that comprise hydroxyl groups; sulfonic acid groups and/or carboxyl groups; sulfonate groups and/or carboxylate groups; or other ionic groups or potentially ionic groups.

Water-dilutable hydroxy-functional polyacrylic resins may be produced by the copolymerization of: (A1) olefinically unsaturated hydroxy-functional monomers; (A2) olefinically unsaturated monomers that comprise ionic groups or potentially ionic groups; and (A3) other olefinically unsaturated monomers. In various non-limiting embodiments, the copolymerization of components (A1) through (A3) is carried out with component (A2) in potentially ionic form (e.g., comprising non-ionic sulfonic acid groups or carboxyl groups), that are at least partially converted to ionic form after copolymerization.

In various non-limiting embodiments, olefinically unsaturated hydroxy-functional monomers (A1) may comprise, for example, hydroxyalkyl esters of acrylic acid or methacrylic acid (e.g., comprising 2 to 4 carbon atoms in the hydroxyalkyl radical) such as 2-hydroxyethyl (meth)acrylate, the isomeric hydroxypropyl (meth)acrylates formed by addition of propylene oxide onto (meth)acrylic acid, the isomeric hydroxybutyl (meth)acrylates; and combinations of any thereof.

In various non-limiting embodiments, olefinically unsaturated monomers that comprise ionic groups or potentially ionic groups (A2) may comprise, for example, a carbonyl group or sulfonic acid group. Suitable monomers (A2) include, for example, olefinically unsaturated mono-carboxylic acids or di-carboxylic acids having a molecular weight of 72 to 207 such as, for example, acrylic acid; methacrylic acid; maleic acid; itaconic acid; and combinations of any thereof. Suitable monomers (A2) also include, for example, olefinically unsaturated compounds comprising sulfonic acid groups such as, for example 2-acrylamido-2-methyl propanesulfonic acid. Mixtures of any olefinically unsaturated monomers that comprise ionic groups or potentially ionic groups may also be used.

In various non-limiting embodiments, other olefinically unsaturated monomers (A3) may comprise, for example, olefinically unsaturated compounds that do not comprise ionic, potentially ionic groups, or hydroxyl groups. Suitable monomers (A3) include, for example, esters of acrylic acid or methacrylic acid comprising 1 to 18, or 1 to 8, carbon atoms in the alcohol radical, such as, for example methyl (meth) acrylate; ethyl (meth)acrylate; isopropyl (meth)acrylate; n-propyl (meth)acrylate; n-butyl (meth)acrylate; 2-ethylhexyl (meth)acrylate; n-stearyl (meth)acrylate; and combinations of any thereof. Suitable monomers (A3) also include, for example, styrene; alkyl-substituted styrenes; propenylbenzene; acrylonitrile; methacrylonitrile; vinyl acetate; vinyl stearate; epoxy-functional co-monomers such as glycidyl acrylate or glycidyl methacrylate; N-methoxymethacrylamide; methacrylamide; and combinations of any thereof.

Water-dilutable hydroxy-functional polyacrylic resins comprising polymerization products of components (A1) through (A3) may be produced using polymerization methods such as, for example, bulk, solution, emulsion and suspension polymerization techniques using free-radical initiators. Suitable processes are described, for example, in U.S. Pat. No. 5,331,039, which is incorporated by reference into this specification.

Olefinically unsaturated hydroxy-functional monomers. (A1) may be used in quantities sufficient to obtain desired hydroxyl numbers such as, for example, hydroxyl group contents of 0.5% to 8% by weight, or 1% to 5% by weight, of the water-dilutable hydroxy-functional polyacrylic resins. For instance, hydroxy-functional monomers (A1) may be used in quantities of 3% to 75% by weight, or 6% to 47% by weight, based on the total weight of the monomers (A1) through (A3).

In various non-limiting embodiments, the quantities of hydroxy-functional monomers (A1) may be selected so that, on a statistical average, the polyacrylic copolymers formed comprise at least two hydroxyl groups per macromolecule.

In various non-limiting embodiments, olefinically unsaturated monomers (A2) that comprise ionic groups or potentially ionic groups may at least partially impart water-dilutability (e.g., aqueous solubility or aqueous dispersability) to water-dilutable hydroxy-functional polyacrylic resins by covalently incorporating into the macromolecules, increasing the hydrophilicity of the macromolecules. The quantity of monomers (A2) used, and the degree of deprotonation of unreacted sulfonic acid or carboxyl groups, should be sufficient to produce a stable aqueous dispersion or aqueous solution, with or without external emulsifiers, dispersants, co-solvents, and the like, as appropriate. For instance, in various non-limiting embodiments, monomers (A2) may be used in quantities of 0.3% to 30% by weight, or 1% to 20% by weight, based on the total weight of the monomers (A1) through (A3).

Depending upon the molecular weight of the polyacrylic resins, their content of ionic groups or potentially ionic groups, and/or any the presence of emulsifiers, co-solvents, and the like, waterborne systems comprising the polyacrylic resins may be either colloidal dispersions, molecular solutions, or mixtures of both. In embodiments using relatively low amounts of monomers (A2), aqueous dispersions (colloidal) generally form, but may comprise a small amount of polymer in aqueous solution. With higher contents of monomers (A2), increasing amounts of resin form an aqueous solution (and decreasing amounts of resin are in colloidal dispersion form). As the relative amount of monomers (A2) increases, more of the water-dilutable hydroxy-functional polyacrylic resin is capable of dissolution into aqueous solution.

Water-dilutable hydroxy-functional polyacrylic resins may have a molecular weight (weight average, as determined by gel permeation chromatography using polystyrene as standard) of 500 to 100000, or 1000 to 50000; a hydroxyl number of 16.5 to 264 mg KOH/g, or 33 to 165 mg KOH/g; and an acid number of 5 to 125 mg KOH/g (based on any acid-based ionic groups or potentially ionic groups, wherein 25% to 100% are present in ionic salt form). Water-dilutable hydroxy-functional polyacrylic resins may be in the form of aqueous solutions and/or dispersions having a solids content 5% to 90% by weight, 10% to 60% by weight, 10% to 50% by weight, 20% to 45% by weight, or 20% to 40% by weight; may have a viscosity at 23° C. of 10 to 100000 mPa·s, or 100 to 10000 mPa·s; and may have a pH of 5 to 10, or 6 to 9. Depending upon the molecular weight of the polyacrylic resins, their content of ionic groups or potentially ionic groups, and/or any the presence of emulsifiers, co-solvents, and the like, waterborne systems comprising the polyacrylic resins may be colloidal dispersions, molecular solutions, or mixtures of both.

In various non-limiting embodiments, the polyol resin component (a) of the aqueous polyurethane coating compositions disclosed herein may comprise a water-dilutable hydroxy-functional polyacrylic resin as described in U.S. Pat. No. 4,151,143; 4,888,383; 5,308,912; 5,331,039; 5,552,477; or 6,962,953, which are incorporated by reference into this specification.

In various non-limiting embodiments, the polyol resin component (a) of the aqueous polyurethane coating compositions disclosed herein may comprise a water-dilutable hydroxy-functional polyacrylic resin. Suitable water-dilutable hydroxy-functional resins polyacrylic resins, are commercially available from Bayer MaterialScience LLC, Pittsburgh, Pa., USA, under the Bayhydrol® trademark.

In various non-limiting embodiments, the aminoplast resin component (b) of the aqueous polyurethane coating compositions disclosed herein may be selected from the group consisting of urea-based resins and melamine-based resins that are water-dilutable. As used herein, the term "aminoplast resin" refers to resins based on urea-formaldehyde or melamine-formaldehyde condensation products. Suitable aminoplast resins are commercially available from Cytec Surface Specialties Inc., Smyrna, Ga., USA, under the Cymel® trademark. Aminoplast resins comprise functional groups, such as, for example, alkoxymethyl groups, which are reactive with hydroxyl groups at temperatures above ambient temperature. For instance, aminoplast resins comprising alkoxymethyl groups may be used to crosslink and cure polyol resins primarily by trans-esterifications reaction between the hydroxyl groups on the polyol resins and the alkoxymethyl groups on the aminoplast resin.

As used herein, the term "cured" refers to the condition of a liquid composition in which an applied film of the composition is at least set-to-touch as defined in ASTM D 5895—*Standard Test Methods for Evaluating Drying or Curing During Film Formation of Organic Coatings Using Mechanical Recorder*, which is hereby incorporated by reference into this specification. As used herein, the terms "cure" and "curing" refer to the progression of an applied liquid composition from the liquid state to a cured state. The terms "cured", "cure", and "curing" encompass drying of compositions through solvent evaporation and chemical crosslinking of components in compositions.

In various non-limiting embodiments, the aminoplast resin component (b) of the aqueous polyurethane coating compositions disclosed herein may comprise a urea-based resin comprising a urea-formaldehyde condensation product. Suitable urea-formaldehyde condensation products include, for example, urea-formaldehyde condensates that are non-etherified, partially-etherified, or fully-etherified with monohydric alcohols comprising 1 to 20 carbon atoms.

In various non-limiting embodiments, the aminoplast resin component (b) of the aqueous polyurethane coating compositions may comprise a melamine-based resin comprising a melamine-formaldehyde condensation product. Suitable melamine-formaldehyde condensation products include, for example, melamine-formaldehyde condensates that are non-etherified, partially-etherified, or fully-etherified with monohydric alcohols comprising 1 to 20 carbon atoms. In various non-limiting embodiments, the aminoplast resin component (b) may comprise monomeric, oligomeric, or polymeric melamine-formaldehyde resins such as, for example, methylated melamines, ethylated melamines, propylated melamines, butylated melamines, and mixed alkylated melamines (e.g., methylated/butylated melamines).

In various non-limiting embodiments, the aminoplast resin component (b) may comprise methylol groups, alkoxymethyl groups, or both. An alkoxymethyl group may be of the general formula —$CH_2OR^1$, where $R^1$ is a linear, cyclic, or branched alkyl chain having from 1 to 20 carbon atoms. In various non-limiting embodiments, the aminoplast resin component (b) may comprise an oligomeric, methylated, and high-imino group-containing melamine-formaldehyde condensate comprising low methylol content. For example, the aminoplast resin component (b) may comprise an oligomeric methylated melamine-formaldehyde condensation product comprising imino groups, methoxymethyl groups, and methylol groups.

In various non-limiting embodiments, the polycarbonate-polyurethane resin component (c) of the aqueous polyurethane coating compositions disclosed herein may comprise a water-dilutable polycarbonate-polyurethane resin. As used herein, the term "polycarbonate-polyurethane resin" refers to oligomeric or polymeric macromolecules comprising carbonate groups and at least one of urethane groups or urea groups. Suitable polycarbonate-polyurethane resins include the aliphatic polycarbonate-polyurethane resin dispersions in water that are commercially available from Bayer MaterialScience, LLC, Pittsburgh, Pa., USA, under the Bayhydrol® trademark.

A water-dilutable polycarbonate-polyurethane resin may comprise a reaction product of: (B1) a polyisocyanate component; (B2) a polycarbonate polyol component; and (B3) an isocyanate-reactive component comprising an ionic group or potentially ionic group.

In various non-limiting embodiments, the polyisocyanate component (B1) may comprise a monomeric organic diisocyanate represented by the formula, $R(NCO)_2$, in which R represents an organic group. In various non-limiting embodiments, R represents a divalent aliphatic hydrocarbon group having from 4 to 18 carbon atoms, a divalent cycloaliphatic hydrocarbon group having from 5 to 15 carbon atoms, a divalent araliphatic hydrocarbon group having from 7 to 15 carbon atoms, or a divalent aromatic hydrocarbon group having 6 to 15 carbon atoms.

Examples of suitable monomeric diisocyanates include, for example: 1,4-tetra-methylene diisocyanate; 1,6-hexamethylene diisocyanate; 1-methyl-2,4(2,6)-diisocyanatocyclohexane; 2,2,4-trimethyl-1,6-hexamethylene diisocyanate; 2,4,4-trimethyl-1,6-hexamethylene diisocyanate; 1,12-dodecamethylene diisocyanate; cyclohexane-1,3-diisocyanate; cyclohexane-1,4-diisocyanate; 1-isocyanato-2-isocyanatomethyl cyclopentane; 1-isocyanato-3-isocyanatomethyl-3,5,5-trimethyl-cyclohexane (isophorone diisocyanate), bis-(4-isocyanato-cyclohexyl)-methane; 1,3- and 1,4-bis-(isocyanatomethyl)-cyclohexane; bis-(4-isocyanatocyclo-hexyl)methane; 2,4'-diisocyanato-dicyclohexyl methane; bis-(4-isocyanato-3-methyl-cyclohexyl)-methane; α,α,α',α'-tetramethyl-1,3- and/or -1,4-xylylene diisocyanate; 1-isocyanato-1-methyl-4(3)-isocyanatomethyl cyclohexane; 2,4- and/or 2,6-hexahydro-toluoylene diisocyanate; 1,3- and/or 1,4-phenylene diisocyanate; 2,4- and/or 2,6-toluene diisocyanate; 2,2'-, 2,4'-, and/or 4,4'-diphenylmethane diisocyanate; naphthalene-1,5-diisocyanate; isomers of any thereof; and combinations of any thereof.

In various non-limiting embodiments, the polyisocyanate component may comprise a monomeric isocyanate comprising three or more isocyanate groups such as, for example, 4-isocyanatomethyl-1,8-octamethylene diisocyanate. The polyisocyanate component may comprise polyphenyl polymethylene polyisocyanates obtained by phosgenating aniline/formaldehyde condensates. The polyisocyanate component may also comprise aromatic isocyanates having three or more isocyanate groups, such as, for example, 4,4',4"-triphenylmethane triisocyanate.

The polyisocyanate component (B1) may also comprise diisocyanate adducts and/or oligomers comprising urethane groups, urea groups, uretdione groups, uretonimine groups, isocyanurate groups, iminooxadiazine dione groups, oxadiazine trione groups, carbodiimide groups, acyl urea groups, biuret groups, and/or allophanate groups. For example, the polyisocyanate component may include:

(1) Isocyanurate group-containing polyisocyanates that may be prepared as set forth in DE-PS 2,616,416; EP-OS 3,765; EP-OS 10,589; EP-OS 47,452; U.S. Pat. No. 4,288, 586; and U.S. Pat. No. 4,324,879, which are incorporated by reference into this specification;

(2) Uretdione diisocyanates that may be prepared by oligomerizing a portion of the isocyanate groups of a diisocyanate in the presence of a suitable catalyst, e.g., a trialkyl phosphine catalyst, and which may optionally be used in admixture with other isocyanates, particularly the isocyanurate group-containing polyisocyanates set forth under (1) above;

(3) Biuret group-containing polyisocyanates that may be prepared according to the processes disclosed in U.S. Pat. Nos. 3,124,605; 3,358,010; 3,644,490; 3,862,973; 3,906,126; 3,903,127; 4,051,165; 4,147,714; and 4,220,749, which are incorporated by reference into this specification, by using co-reactants such as water, tertiary alcohols, primary and secondary monoamines, and primary and/or secondary diamines;

(4) Iminooxadiazine dione and, optionally, isocyanurate group-containing polyisocyanates, that may be prepared in the presence of fluorine-containing catalysts as described in DE-A 19611849, which is incorporated by reference into this specification;

(5) Carbodiimide group-containing polyisocyanates that may be prepared by oligomerizing diisocyanates in the presence of carbodiimidization catalysts as described in DE-PS 1,092,007; U.S. Pat. No. 3,152,162; and DE-OS 2,504,400, DE-OS 2,537,685, and DE-OS 2,552,350, which are incorporated by reference into this specification; and (6) Polyisocyanates containing oxadiazinetrione groups, e.g., the reaction product of two moles of a diisocyanate and one mole of carbon dioxide.

Polyisocyanate components (B1) comprising diisocyanate adducts and/or oligomers may have an average isocyanate group functionality of 2 to 6 or 2 to 4, for example. Polyisocyanate components (B1) comprising diisocyanate adducts and oligomers may have an average isocyanate (NCO) content of 5% to 30%, 10% to 25%, or 15% to 25%, by weight of the component.

In various non-limiting embodiments, the polyisocyanate component (B1) may be a monomeric (cyclo)aliphatic diisocyanate such as, for example, a diisocyanate selected from the group consisting of 1,6-hexamethylene diisocyanate (HDI); 1-isocyanato-3-isocyanatomethyl-3,5,5-trimethyl-cyclohexane (isophorone diisocyanate or IPDI); 4,4'-diisocyanatodicyclohexylmethane ($H_{12}$MDI); 1-methyl-2,4(2,6)-diisocyanatocyclohexane; isomers of any thereof; and combinations of any thereof. For example, in various non-limiting embodiments, $H_{12}$MDI may be used to produce (c) water-dilutable polycarbonate-polyurethane resin. In various non-limiting embodiments, the polyisocyanate component (B1) may comprise 50 to 100 weight percent of aliphatic diisocyanate and 0 to 50 weight percent of other aliphatic polyisocyanates having a molecular weight of 140 to 1500, such as, for example, diisocyanate adduct and/or oligomer.

In various non-limiting embodiments, a polyisocyanate component (B1) may comprise at least one of HDI, IPDI, $H_{12}$MDI, 1-methyl-2,4(2,6)-diisocyanatocyclohexane, and/or adducts of these diisocyanates comprising isocyanurate, uretdione, biuret, and/or iminooxadiazine dione groups as described above.

In various non-limiting embodiments, a polycarbonate polyol component (B2) may comprise a polycondensation reaction product of polyhydric alcohols and phosgene or a polycondensation reaction product of polyhydric alcohols and diesters of carbonic acid. Suitable polyhydric alcohols include, for example, diols such as 1,3-propanediol; ethylene glycol; propylene glycol; 1,4-propanediol; diethylene glycol; triethylene glycol; tetraethylene glycol; 1,4-butanediol; 1,6-hexanediol; trimethylenepentanediol; 1,4-cyclohexanediol; 1,4-cyclohexanedimethanol; neopentyl glycol; 1,8-octanediol; and combinations of any thereof. Suitable polyhydric alcohols also include, for example, tri-functional and multi-functional hydroxyl compounds such as glycerol; tri-methylolpropane; trimethylolethane; hexanetriol isomers; pentaerythritol; and combinations of any thereof. Tri-functional and multi-functional hydroxyl compounds may be used to produce a polycarbonate polyol having a branched structure.

A polycarbonate polyol may have an average hydroxyl functionality of 1 to 5, or any sub-range therein, such as, for example, 1 to 2, 1.5 to 2.5, 1.2 to 2.2, or 1.8 to 2.2. A polycarbonate polyol may have an average molecular weight of 300 to 10000 or any sub-range therein, such as, for example, 300 to 5000, 1000 to 8000, 1000 to 6000, 2000 to 6000, 500 to 6000, 500 to 3000, or 1000 to 3000. A polycarbonate polyol may have an OH number of 25 to 350 mg KOH/g solids.

In various non-limiting embodiments, an isocyanate-reactive component (B3) comprising an ionic group or potentially ionic group may comprise an ionic group or potentially ionic group may at least partially impart water-dilutability (e.g., aqueous solubility or aqueous dispersability) to water-dilutable polycarbonate-polyurethane resins by covalently incorporating into the macromolecules, increasing the hydrophilicity of the macromolecules. The isocyanate-reactive component (B3) may comprise at least one ionic group or potentially ionic group, which may be either cationic or anionic in nature. The isocyanate-reactive component (B3) may also comprise at least one isocyanate-reactive group such as for example, a hydroxyl group and/or an amine group. The isocyanate-reactive functionality of the isocyanate-reactive component (B3) and the hydroxyl functionality of the polycarbonate polyol component (B2) may react with the isocyanate functionality of the polyisocyanate component (B1) to, at least in part, produce a water-dilutable polycarbonate-polyurethane resin.

Cationic and anionic isocyanate-reactive components (B3) include compounds comprising, for example, sulfonium groups, ammonium groups, phosphonium groups, carboxylate groups, sulfonate groups, phosphonate groups, or the corresponding non-ionic acid groups (i.e., potentially ionic groups) that can be converted by deprotonation (i.e., salt formation) into these groups.

Suitable isocyanate-reactive components (B3) include, for example, mono-hydroxycarboxylic acids; di-hydroxycarboxylic acids; mono-aminocarboxylic acids; di-aminocarboxylic acids; mono-hydroxysulfonic acids; di-hydroxysulfonic acids; mono-aminosulfonic acids; di-aminosulfonic acids; mono-hydroxyphosphonic; di-hydroxyphosphonic acids; mono-aminophosphonic acids; di-aminophosphonic acids; their ionic salts; and combinations of any thereof.

Suitable isocyanate-reactive components (B3) include, for example, dimethylolpropionic acid; dimethylolbutyric acid; hydroxypivalic acid; N-(2-aminoethyl)-β-alanine; ethylenediame-propyl- or butyl-sulfonic acid; 1,2- or 1,3-propylenediamine-β-ethylsulfonic acid; citric acid; glycolic acid; lactic acid; 2-aminoethylaminoethanesulfonic acid; glycine; alanine; taurine; lysine; 3,5-diaminobenzoic acid; an adduct of isophorone diisocyanate (IPDI) and acrylic acid (see, e.g., European Patent No. 916,647) and its alkali metal and/or ammonium salts; an adduct of sodium bisulfite with but-2-ene-1,4-diol; polyethersulfonate; and the propoxylated adduct of 2-butenediol and $NaHSO_3$ (see, e.g., German Patent No. 2,446,440).

Likewise, suitable isocyanate-reactive components (B3) include, for example, other 2,2-bis(hydroxymethyl)alkanecarboxylic acids such as dimethylolacetic acid and 2,2-dimethylolpentanoic acid. In addition, suitable isocyanate-reactive components (B3) include dihydroxysuccinic acid, Michael adducts of acrylic acid with amines such as isophoronediamine or hexamethylenediamine, or mixtures of such acids and/or dimethylolpropionic acid and/or hydroxypivalic acid. Further, suitable isocyanate-reactive components (B3) include sulfonic acid diols optionally comprising ether groups, for example, the compounds described in U.S. Pat. No. 4,108,814, which is incorporated by reference into this specification.

In various non-limiting embodiments, the water-polycarbonate-polyurethane resin comprises a reaction product of components (B1), (B2), and an isocyanate-reactive component (B3) possessing carboxyl or carboxylate groups, sulfonic acid or sulfonate groups, and/or ammonium groups. The isocyanate-reactive component (B3) may be incorporated into water-dilatable polycarbonate-polyurethane resin macromolecules by urethane-forming and/or urea-forming reactions between the isocyanate-reactive groups and the isocyanate groups of the polyisocyanate component (B1).

In various non-limiting embodiments, an optional isocyanate-reactive component (B4) may comprise, for example, chain extenders and/or chain terminators. A chain-extending and/or chain-terminating component may comprise an ionic group or potentially ionic group and at least one group that is reactive with isocyanate groups in an addition reaction. Examples of chain-extending components include, for example, methyleriediamine; ethylenediamine; propylenediamine; 1,4-butylenediamine; 1,6-hexamethylenediamine; 2-methyl-1,5-pentanediamine (Dytek-A from DuPont); 1-amino-3,3,5-trimethyl-5-aminomethyl cyclohexane (isophorone diamine); piperazine; 1,4-diaminocyclohexane; bis (4-aminocyclohexyl)methane; adipic acid dihydrazide; alkylene oxide diamines; dipropylamine diethyleneglycol; N-(2-aminoethyl)-2-aminoethane sulfonic acid (or salt thereof); N-(2-aminoethyl)-2-aminopropionic acid (or salt thereof); and combinations of any thereof.

Examples of chain-terminating components include, for example, compounds having the formula:

wherein $R_1$ is a hydrogen atom or alkyl radical, optionally having a hydroxyl end and $R_2$ is an alkyl radical, optionally having a hydroxyl end. Suitable chain-terminating compounds include compounds such as monoamines or monoalcohols. Examples include, but are not limited to, methylamine; ethylamine; propylamine; butylamine; octylamine; laurylamine; stearylamine; isononyloxy-propylamine; dimethylamine; diethylamine; dipropylamine; dibutylamine; N-methylaminopropylamine; diethyl(methyl)aminopropylamine; morpholine; piperidine; diethanolamine; and combinations of any thereof. Also suitable are chain terminating alcohols, such as, for example, $C_1$-$C_{10}$ or higher alcohols including, methanol, butanol, hexanol, 2-ethylhexyl alcohol, isodecyl alcohol, and the like, and mixtures thereof, as well as amino-alcohols, such as, for example, aminomethylpropanol (AMP).

A water-dilutable polycarbonate-polyurethane resin may be prepared by reacting components (B1) through (B4) using an acetone process or modification thereof. A description of suitable processes may be found, for example, in *Methoden der Organischen Chemie*, Houben-Weyl, 4th Edition, Volume E20/Part 2, p. 1682, Georg Thieme Verlag, Stuttgart, 1987, which is incorporated by reference into this specification.

A non-limiting example of an acetone process is described below. In a first stage an adduct comprising unreacted isocyanate groups is synthesized from a polyisocyanate component (B1), a polycarbonate polyol component (B2), and an isocyanate-reactive component (B3) comprising an ionic group or potentially ionic group. In a second stage, the adduct is dissolved in an organic, at least partially water-miscible, solvent comprising no isocyanate-reactive groups. Suitable solvents include acetone; methylethyl ketone (MEK); 2-butanone; tetrahydrofuran; dioxin; and combinations of any thereof. In a third stage, the unreacted isocyanate-containing adduct solution is reacted with mixtures of amino-functional chain-extenders and/or chain-terminators. An amino-functional chain-extender may comprise a sulfonic acid group or carboxyl group (in either nonionic acid form or ionic salt form). In a fourth stage, the water-dilutable polycarbonate-polyurethane resin product is dispersed in the form of a fine-particle dispersion by addition of water to the organic solution or by addition of the organic solution to water. In a fifth stage, the organic solvent is partially or wholly removed by distillation, optionally under reduced pressure.

A water-dilutable polycarbonate-polyurethane resin may be characterized by a glass transition temperature of between −60° C. and 0° C., such as, for example, between −40° C. and −20° C. A dispersion of a water-dilutable polycarbonate-polyurethane resin may have a viscosity at 25° C. of less than 1000 mPa·s or less than 500 mPa·s, for example, between 50 and 1000 mPa·s or 50 and 500 mPa·s. A water-dilutable polycarbonate-polyurethane resin may have a number average molecular weight range of 500 to 6000.

In various non-limiting embodiments, the one-component thermally-curable aqueous polyurethane coating compositions disclosed herein may be formulated by blending a polyol resin component (a); an aminoplast resin component (b), and a polycarbonate-polyurethane resin component (c). Polyol resin component (a) and aminoplast resin component (b) may be utilized in amounts such that an equivalent ratio of the alkoxymethyl groups of the aminoplast resin component (b) to the hydroxyl groups of the polyol resin component (a) is at least 0.05:1, for example from 0.05:1 to 20:1.

In various non-limiting embodiments, the polycarbonate-polyurethane resin component (c) is non-functional. As used herein, the term "non-functional," with respect to a chemical component of the one-component thermally-curable aqueous polyurethane coating compositions disclosed herein, refers to a substantial lack of chemical reactivity with polyol resin components (a) and aminoplast resin components (b). For example, a non-functional polycarbonate-polyurethane resin component (c) does not chemically react with components (a) and/or (b) of the coating composition during thermal curing. In this manner, a non-functional polycarbonate-polyurethane resin component (c) is substantially free of unreacted isocyanate groups, unreacted hydroxyl groups, isocyanate-reactive groups, hydroxyl-reactive groups, and other functional groups that may be reactive with any functional groups comprising polyol resin components (a) and aminoplast resin components (b).

The one-component thermally-curable aqueous polyurethane coating compositions disclosed herein may be produced by blending water-dilutable polyol resin component (a), water-dilutable aminoplast resin component (b), and water-dilutable polycarbonate-polyurethane resin component (c). These components may be blended in aqueous dispersion, aqueous solution, or a combination of aqueous dispersion and aqueous solution, optionally with emulsifiers, dispersants, surfactants, co-solvents, and/or the like. For instance, water-dilutable polyol resin component (a), water-dilutable aminoplast resin component (b), and water-dilutable polycarbonate-polyurethane resin component (c) may be provided as separate aqueous dispersions, aqueous solutions, and/or dispersion/solutions in water-miscible solvents, which are combined together to create an aqueous mixture of components (a), (b), and (c). It is also possible to mix any combination of the components (a), (b), and/or (c) in anhydrous form, or as a solution/dispersion in a non-aqueous water-miscible solvent, and then disperse the mixture of components (a), (b), and/or (c) in water.

One-component thermally-curable aqueous polyurethane coating compositions comprising a polyol resin component (a); an aminoplast resin component (b); and a polycarbonate-polyurethane resin component (c) may be characterized by a blended binder in which components (a) and (b) mutually react during curing to crosslink the resins, but component (c) is non-functional (i.e., non-reactive) with components (a) and (b), and therefore, creates an interpenetrating non-crosslinked polymer network with respect to the crosslinked polymer network comprising a reaction product of components (a) and (b).

In various non-limiting embodiments, the one-component thermally-curable aqueous polyurethane coating compositions described herein may comprise 1% to 99% by weight, preferably 40% to 90% by weight, most preferably 60% to 80% by weight on a solids basis of a water-dilutable hydroxy-functional polyacrylic resin; and a water-dilutable aminoplast resin; and 99% to 1% by weight, preferably 60% to 10% by weight, most preferably 40% to 20% by weight on a solids basis of a water-dilutable non-functional polycarbonate-polyurethane resin.

In various non-limiting embodiments, the weight ratio on a solids basis of the polyol resin component (a) to the aminoplast resin component (b) may be from 55:45 to 85:15. In various non-limiting embodiments, the weight ratio on a solids basis of the polyol resin component (a) to the aminoplast resin component (b) may be from 60:40 to 70:30.

In various non-limiting embodiments, one-component thermally-curable aqueous polyurethane coating compositions comprising a polyol resin component (a); an aminoplast resin component (b); and a polycarbonate-polyurethane resin component (c) may comprise optional components such as, for example, additional water-dilutable resin components based on polymeric polyols. Additional water-dilutable resin components based on polymeric polyols may include, for example, polyether polyols, polyester polyols, polyepoxide polyols, polylactone polyols, polyacrylate polyols, polycarbonate polyols, and combinations of any thereof. Additional water-dilutable resin components may be formulated in admixture in aqueous solution and/or aqueous dispersion with the resin components (a), (b), and (c).

In various non-limiting embodiments, one-component thermally-curable aqueous polyurethane coating compositions comprising a polyol resin component (a); an aminoplast resin component (b); and a polycarbonate-polyurethane resin component (c) may be dried and/or thermally cured by any suitable means known to those skilled in the art such as, for example, air drying, accelerated drying by exposure to heat, and thermal curing by exposure to heat. For example, in various non-limiting embodiments, one-component thermally-curable aqueous polyurethane coating compositions comprising a polyol resin component (a); an aminoplast resin component (b); and a polycarbonate-polyurethane resin component (c) may be thermally cured by exposure to temperatures of 100° C. to 250° C. for 15 minutes to 60 minutes. The energy needed to cure the system can come from any source known to those skilled in the art including, but not limited to conventional convection ovens, infrared heat sources, microwaves, electron beams, or combination thereof.

The one-component thermally-curable aqueous polyurethane coating compositions disclosed herein may produce cured coating films that exhibit microhardness values of no greater than 90 N/mm$^2$ (Martens/Universal Hardness). In various non-limiting embodiments, the one-component thermally-curable aqueous polyurethane coating compositions disclosed herein may produce cured coating films that exhibit microhardness values of no greater than 75 N/mm$^2$, 65 N/mm$^2$, 55 N/mm$^2$, 50 N/mm$^2$, 45 N/mm$^2$, 35 N/mm$^2$, 25 N/mm$^2$, 20 N/mm$^2$, or 15 N/mm$^2$.

In various non-limiting embodiments, the one-component thermally-curable aqueous polyurethane coating compositions disclosed herein may produce cured coating films that exhibit impact strength values of at least 20 in-lbs (direct and/or reverse, determined according to ASTM D2794-93 (2010): *Standard Test Method for Resistance of Organic Coatings to the Effects of Rapid Deformation (Impact)*, which is incorporated by reference into this specification). In various non-limiting embodiments, the one-component thermally-curable aqueous polyurethane coating compositions disclosed herein may produce cured coating films that exhibit impact strength values of at least 120 in-lbs, 140 in-lbs, or 160 in-lbs.

In various non-limiting embodiments, the one-component thermally-curable aqueous polyurethane coating compositions disclosed herein may also comprise silane-functional adhesion promoters such as, for example, the adhesion promoters disclosed in U.S. Pat. No. 6,403,175, which is incorporated by reference into this specification. Suitable adhesion promoters include, for example, γ-mercaptopropyltrimethoxysilane; 3-aminopropyltriethoxysilane; 3-aminopropylsilane hydrolysate; 3-glycidyloxypropyltriethoxysilane; and combinations of any thereof.

The one-component thermally-curable aqueous polyurethane coating compositions disclosed herein may be applied to substrates using any suitable methods, such as, for example, spraying; knife coating; curtain coating; vacuum coating; rolling; pouring; dipping; spin coating; squeegeeing; brushing; squirting; screen printing; gravure printing; flexographic printing; or offset printing. Suitable substrates include, for example, glass; wood; metal; paper; leather; textiles; felt, concrete; masonry; ceramic; stone; and plastics such as, for example, moldings and films of ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM, and UP (abbreviations according to DIN 7728T1). The one-component thermally-curable aqueous polyurethane coating compositions disclosed herein may be applied to substrates comprising combinations of the above materials. The one-component thermally-curable aqueous polyurethane coating compositions disclosed herein may also be applied as undercoatings or overcoatings with other coatings. The one-component thermally-curable aqueous polyurethane coating compositions disclosed herein may also be applied to a temporary substrate support, dried and/or cured partly or fully, and detached from the substrate support to produce free films, for example.

In various non-limiting embodiments, the one-component thermally-curable aqueous polyurethane coating compositions disclosed herein may be especially suitable for glass substrates, such as, for example, flat glass, glass panels, and glass containers such as glass jars or glass bottles. Further, the one-component thermally-curable aqueous polyurethane coating compositions disclosed herein provide marring resistance and durability, which may be advantageous, for example, during glass container filling operations. Glass substrates comprising the one-component thermally-curable aqueous polyurethane coating compositions disclosed herein may be characterized by good hand feel. The one-component thermally-curable aqueous polyurethane coating compositions disclosed herein may be applied to glass substrates with or without hot end coating, with or without cold end coating, or both; and with or without a silane pre-treatment of the glass substrates.

The one-component thermally-curable aqueous polyurethane coating compositions disclosed herein may provide design freedom to manufacture transparent, pigmented, high gloss, matte, and frosted looks on glass substrates. Suitable representative pigments that may be formulated into the one-component thermally-curable aqueous polyurethane coating compositions disclosed herein include, for example, rutile and anatase titanium dioxide, yellow and red iron oxides, green and blue copper phthalocyanine, carbon blacks, leafing and nonleafing aluminum, barium sulfate, calcium carbonate, sodium silicate, magnesium silicate, zinc oxide, antimony oxide, di-arylide yellow, monoarylide yellow, nickel arylide yellow, benzimidazolone oranges, naphthol reds, quinacridone reds, pearlescent pigments (e.g., mica platelets), bronze platelets, nickel platelets, stainless steel platelets, micronized matting agents (e.g., methylenediaminomethylether-polycondensate), and combinations of any thereof.

The one-component thermally-curable aqueous polyurethane coating compositions disclosed herein may be applied over a label (e.g. pressure-sensitive labels, UV-activated labels, heat transfer labels, and the like) or over a decorative organic and/or inorganic coating that has previously been applied to a glass substrate. Suitable decorative organic coatings that may be used with the one-component thermally-curable aqueous polyurethane coating compositions disclosed herein include, for example, EcoBrite Organic Ink (PPG Industries, Inc., Pittsburgh, Pa., USA) and SpecTruLite (Ferro Corporation, Cleveland, Ohio, USA).

A primer treatment may be applied to a glass substrate before application of a one-component thermally-curable aqueous polyurethane coating composition as disclosed herein. The primer treatment may be any coating that provides lubrication to protect a glass substrate between the time of manufacture and the time of application of the coating and/or improves the adhesion of the coating to the glass substrate. A primer treatment may comprise both a hot end coating and a cold end coating. A glass substrate may not have a hot end coating, such that a primer treatment comprises a cold end coating applied only after the substrate has been substantially cooled. A primer treatment may comprise a cold end coating, the cold end coating comprising a diluted silane composition or mixture of a silane composition and a surface-treatment composition. Any silane composition suitable for use as a primer on a glass substrate may be used in a primer coating, non-limiting examples of which include monoalkoxy-silanes, dialkoxysilanes, trialkoxysilanes, and tetralkoxysilanes.

A surface-treatment composition may comprise polyethylene compositions, stearate compositions, or mixtures thereof, which do not require removal before the application of further coatings to the glass substrates. Stearate compositions may comprise the salts and esters of stearic acid (octadecanoic acid), such as, for example, a T5 stearate coating (Tegoglas, Arkema, Philadelphia, Pa., USA). A primer coating may be in the form of an aqueous solution, dispersion, or emulsion. For example, a surface-treatment composition may comprise a polyethylene emulsion such as Duracote, Sun Chemical. A primer treatment also may comprise additional compositions to improve subsequently applied coatings, non-limiting examples of which include surfactants and lubricants.

In various non-limiting embodiments, the one-component thermally-curable aqueous polyurethane coating compositions disclosed herein may function as a primer coating and a topcoating, providing sufficient lubricity, mar resistance, and toughness for line processing of glass containers.

The non-limiting and non-exhaustive examples that follow are intended to further describe various non-limiting and non-exhaustive embodiments without restricting the scope of the embodiments described in this specification. In the following examples, all parts and percentages are by weight, unless otherwise indicated.

EXAMPLES

One-component thermally-curable aqueous polyurethane coating compositions comprising a polyacrylic polyol resin, an aminoplast resin, and a polycarbonate-polyurethane resin were prepared as follows. Aqueous dispersions of a hydroxy-functional polyacrylic resin (Bayhydrol® A XP 2770, Bayer MaterialScience LLC, Pittsburgh, Pa., USA) were mixed with Cymel® 327 and Bayhydrol® XP 2637. Bayhydrol® A XP 2770 is a polyacrylic resin provided as an aqueous dispersion of approximately 45% solids having 3.9% hydroxyl content on a solids weight basis.

Dipropylene glycol, γ-mercaptopropyltrimethoxysilane (Silquest® A-189, Momentive Performance Materials, Albany, N.Y., USA), and 3-aminopropyl-triethoxysilane (Dynasylan® AMEO, Evonik Corporation, Parsippany, N.J., USA) were added with continuous stirring to the aqueous mixtures of the hydroxy-functional polyacrylic resin, the aminoplast resin, and the polycarbonate-polyurethane resin. The resulting mixtures were agitated using a mechanical mixer until homogeneous mixtures were obtained. The homogeneous mixtures were deaerated and stored overnight before use. The mixtures were prepared according to the formulations provided in Table 1 (parts by weight, solvent weight included).

TABLE 1

| Components | A | B | C | D | E | F | G | H | I | J |
|---|---|---|---|---|---|---|---|---|---|---|
| | Formulations | | | | | | | | | |
| polyacrylic resin dispersion | 71.84 | 53.88 | 82.42 | 72.02 | 61.72 | 49.38 | 32.92 | 90.86 | 68.15 | 0 |
| aminoplast resin | 26.16 | 19.62 | 15.58 | 13.73 | 11.78 | 9.42 | 6.28 | 7.14 | 5.36 | 14.70 |
| polycarbonate-polyurethane resin dispersion | 0 | 24.5 | 0 | 12.25 | 24.5 | 39.2 | 58.8 | 0 | 24.5 | 83.3 |
| dipropylene glycol | 1.6 | 1.6 | 1.6 | 1.6 | 1.6 | 1.6 | 1.6 | 1.6 | 1.6 | 1.6 |

TABLE 1-continued

| Components | A | B | C | D | E | F | G | H | I | J |
|---|---|---|---|---|---|---|---|---|---|---|
| γ-mercaptopropyltrimethoxysilane | 0.2 | 0.2 | 0.2 | 0.2 | 0.2 | 0.2 | 0.2 | 0.2 | 0.2 | 0.2 |
| 3-aminopropyl-triethoxysilane | 0.2 | 0.2 | 0.2 | 0.2 | 0.2 | 0.2 | 0.2 | 0.2 | 0.2 | 0.2 |
| Binder Resin Component Weight Ratios | | | | | | | | | | |
| polyacrylic resin/aminoplast resin (wt/wt on solids) | 55/45 | 55/45 | 70/30 | 70/30 | 70/30 | 70/30 | 70/30 | 85/15 | 85/15 | 0/100 |
| Coating Properties | | | | | | | | | | |
| Direct Impact (in-lbs) | 20 | 160 | 20 | 60 | 160 | 160 | 160 | 20 | 160 | 160 |
| Reverse Impact (in-lbs) | <20 | 160 | <20 | 20 | 160 | 160 | 160 | <20 | 160 | 160 |
| Microhardness (N/mm$^2$) | 64 | 34 | 139 | 87 | 51 | 18 | 13 | 152 | 64 | 1 |
| Scribe adhesion | Pass | Pass | Pass | Pass | Pass | Pass | Pass | Pass | Pass | Pass |

The one-component thermally-curable aqueous polyurethane coating compositions were tested for impact resistance, microhardness, and adhesion. Coatings for impact resistance testing were applied onto Bonderite B1000 cold rolled steel panels using a number 50 wire wound rod. Coatings for microhardness testing were applied onto glass disks using an Eppendorf pipettor (80 microliters) and spread over the disks using the pipettor tip. Coatings for adhesion testing were applied onto the airside of 4-inch by 4-inch glass Taber panels using a number 50 wire wound rod.

The applied coatings were cured at 170° C. for 30 minutes in an oven. The coatings applied to the glass disks for microhardness testing were allowed to air-dry under ambient conditions for about 120 minutes before the oven cure. All testing was performed at least 24 hours after the applied coatings and substrates were removed from the oven. The film thicknesses of the cured coatings on the steel panels were measured using a Fischerscope MMS instrument according to ASTM D1186-93: *Standard Test Methods for Nondestructive Measurement of Dry Film Thickness of Nonmagnetic Coatings Applied to a Ferrous Base*, which is incorporated by reference into this specification. The film thicknesses were in the range of 0.75 to 2.25 mils.

Impact resistance testing was performed according to ASTM D2794-93 (2010): *Standard Test Method for Resistance of Organic Coatings to the Effects of Rapid Deformation (Impact)*, which is incorporated by reference into this specification. Microhardness (Martens/Universal Hardness) testing was performed on a Fischerscope H100C instrument. Adhesion testing was performed according to ASTM D4060-95: *Standard Test Method for Abrasion Resistance of Organic Coatings by the Taber Abraser*, which is incorporated by reference into this specification. Scribe adhesion testing was performed on glass Taber panels. Two one-inch long scribes diagonal to each other were cut using a utility knife and the adhesion of the film to glass was inspected visually. If no film peeled from the substrate, the coating was marked as "pass."

The results of the impact resistance testing, microhardness testing, and scribe adhesion testing are presented in Table 1. The addition of non-functional polycarbonate-polyurethane resin improved the flexibility, and toughness of the coatings, as shown by the decrease in microhardness and/or the increase in direct and/or reverse impact strength. Further, addition of non-functional polycarbonate-polyurethane resin did not have a negative affect on adhesion. For instance, formulations A, C, and H did not contain any polycarbonate-polyurethane resin, but formulations B, D, and I contained additions of approximately 25% of the polycarbonate-polyurethane resin dispersion (10% on a solids basis), relative to formulations A, C, and H, respectively. Comparisons of formulations A and B, formulations C and D, and formulations H and I, shows that the addition of the non-functional polycarbonate-polyurethane resin generally decreased the hardness and increased the impact strength of the cured coating films.

Further, formulations C, D, E, F, and G all had the same weight ratio of hydroxy-functional polyacrylic resin to aminoplast resin. Formulation C was free of non-functional polycarbonate-polyurethane resin, and formulations D though G had increasing non-functional polycarbonate-polyurethane resin content, i.e., 12% dispersion (5% solids), 25% dispersion (10% solids), 40% dispersion, (16% solids), and 60% dispersion, (24% solids), respectively. A comparison of formulation C with formulations D though G shows that increasing the content of non-functional polycarbonate-polyurethane resin decreases hardness while increasing impact strength and toughness, and maintaining good substrate adhesion.

As shown in the above examples, the one-component thermally-curable aqueous polyurethane coating compositions disclosed herein exhibit low hardness, high impact resistance, high toughness, high abrasion resistance, good adhesion to glass substrates, while being free of blocking agents and comprising aminoplast resins. These results are significant and unexpected because, generally, aminoplast resins produce relatively hard cured coating films when used to crosslink polyol resins. As such, the one-component thermally-curable aqueous polyurethane coating compositions disclosed herein facilitate the use of aminoplast crosslinking resins without undesirable coating properties such as, for example, increased brittleness, decreased impact resistance and toughness. Therefore, the one-component thermally-curable aqueous polyurethane coating compositions disclosed herein are particularly advantageous for substrates such as, for example, glass materials, which may readily show mechanical surface damage of relatively hard and brittle coating films on the substrate.

In various non-limiting embodiments, the one-component thermally-curable aqueous polyurethane coating compositions disclosed herein may be used to coat glass containers such as, for example, glass bottles and glass jars. The improved coating properties exhibited by the one-component thermally-curable aqueous polyurethane coating compositions disclosed herein (e.g., low hardness, high impact resistance, high toughness, and good adhesion to glass substrates) are particularly advantageous in glass container manufacturing operations where the containers may undergo significant scuffing and/or marring as the containers are handled by machinery in line operations and experience line pressure. The one-component thermally-curable aqueous polyurethane coating compositions disclosed herein provide surface coatings that are capable of withstanding and absorbing impact pressures during line operations with minimal or zero surface scuffing, or marring.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant reserves the right to amend the claims during prosecution to add features as variously described in this specification, and such amendments comply with the requirements of 35 U.S.C. §112, first paragraph, and 35 U.S.C. §132(a).

What is claimed is:

1. An aqueous polyurethane coating composition comprising:
   (a) a water-dilutable hydroxy-functional polyacrylic resin comprising a reaction product of:
      (A1) an olefinically unsaturated hydroxy-functional monomer;
      (A2) an olefinically unsaturated monomer that comprises an ionic group or a potentially ionic group; and
      (A3) an olefinically unsaturated monomer that does not comprise an ionic group, a potentially ionic group, or a hydroxyl group;
   (b) a water-dilutable aminoplast resin; and
   (c) a water-dilutable polycarbonate-polyurethane resin, wherein the polycarbonate-polyurethane resin is non-functional.

2. The aqueous polyurethane coating composition of claim 1, wherein the hydroxy-functional polyacrylic resin component (a) has a weight average molecular weight of 500-100000, a hydroxyl number of 16.5 to 264 mg KOH/g and an acid number of 5 to 125 mg KOH/g.

3. The aqueous polyurethane coating composition of claim 1, wherein the aminoplast resin component (b) comprises a melamine-formaldehyde condensation product.

4. The aqueous polyurethane coating composition of claim 1, wherein the polycarbonate-polyurethane resin component (c) is characterized by a glass transition temperature of between −60° C. and 0° C.

5. The aqueous polyurethane coating composition of claim 1, wherein the polycarbonate-polyurethane resin component (c) is characterized by a viscosity at 25° C. of less than 500 mPa·s in an 38% to 42% solids aqueous dispersion.

6. The aqueous polyurethane coating composition of claim 1, further comprising an additional polyol resin selected from the group consisting of water-dispersible hydroxy-functional polyester resins and water-dispersible hydroxy-functional polyether-polyurethane resins.

7. A glass substrate at least partially coated with the coating composition of claim 1.

8. A glass container at least partially coated with the coating composition of claim 1.

9. The aqueous polyurethane coating composition of claim 1, wherein the aminoplast resin component (b) comprises an oligomeric methylated melamine-formaldehyde condensation product comprising imino groups, methoxymethyl groups, and methylol groups.

10. The aqueous polyurethane coating composition of claim 9, wherein an equivalent ratio of methylol groups and alkoxylmethyl groups of component (b) to hydroxyl groups of component (a) is at least 0.05:1.

11. The aqueous polyurethane coating composition of claim 1, wherein the polycarbonate-polyurethane resin component (c) comprises a reaction product of a polycarbonate polyol and a polyisocyanate selected from the group consisting of 4,4'-diisocyanatodicyclohexylmethane, isophorone diisocyanate, 1,6-hexamethylene diisocyanate, and 1-methyl-2,4(2,6)-diisocyanatocyclohexane.

12. The aqueous polyurethane coating composition of claim 11, wherein the polycarbonate polyol has a number average molecular weight range 500 to 6000.

13. The aqueous polyurethane coating composition of claim 1, comprising:
   99% to 1% by weight on a solids basis of the water-dilatable hydroxy-functional polyacrylic resin and a water-dilutable aminoplast resin; and
   1% to 99% by weight on a solids basis of the water-dilutable polycarbonate-polyurethane resin
   wherein the weight percents total 100% by weight.

14. The aqueous polyurethane coating composition of claim 13, comprising:
   40% to 90% by weight on a solids basis of the water-dilutable hydroxy-functional polyacrylic resin; a water-dilutable aminoplast resin; and
   60% to 10% by weight on a solids basis of the water-dilutable polycarbonate-polyurethane resin
   wherein the weight percents total 100% by weight.

15. The aqueous polyurethane coating composition of claim 1, wherein the weight ratio on a solids basis of the hydroxy-functional polyacrylic resin to the aminoplast resin is from 55:45 to 85:15.

16. The aqueous polyurethane coating composition of claim 15, wherein the weight ratio on a solids basis of the hydroxy-functional polyacrylic resin to the aminoplast resin is from 60:40 to 70:30.

17. The aqueous polyurethane coating composition of claim 1, further comprising a silane-functional adhesion promoter.

18. The aqueous polyurethane coating composition of claim 17, wherein the adhesion promoter is selected from the group consisting of γ-mercaptopropyl-trimethoxysilane, 3-aminopropyltriethoxysilane, 3-aminopropylsilane hydrolysate, 3-glycidyloxypropyltriethoxysilane, and combinations of any thereof.

19. A substrate at least partially coated with the coating composition of claim 1.

20. The substrate of claim 19, wherein the coating exhibits microhardness of no greater than 90 N/mm$^2$, direct impact strength of at least 60 in-lbs, and reverse impact strength of at least 20 in-lbs.

* * * * *